A. L. McMURTRY.
TIRE RIM TOOL.
APPLICATION FILED SEPT. 28, 1912.

1,058,619.

Patented Apr. 8, 1913.

WITNESSES

INVENTOR
Alden L. McMurtry
BY
E. W. Marshall
ATTORNEY

UNITED STATES PATENT OFFICE.

ALDEN L. McMURTRY, OF SOUND BEACH, CONNECTICUT.

TIRE-RIM TOOL.

1,058,619.  Specification of Letters Patent.  Patented Apr. 8, 1913.

Application filed September 28, 1912. Serial No. 722,346.

*To all whom it may concern:*

Be it known that I, ALDEN L. MCMURTRY, a citizen of the United States, and a resident of Sound Beach, Connecticut, have invented certain new and useful Improvements in Tire-Rim Tools, of which the following is a specification, reference being had to the accompanying drawings, forming a part thereof.

My invention relates to a tool for joining or disjoining removable rims for vehicle wheels and particularly such rims as comprise a pair of similar annular parts which are connected by a plurality of bayonet joints.

The object of my invention is to provide a simple and durable tool or device which may be readily attached to a pair of rim members, of the character above specified, for assisting in either connecting or disconnecting the rim members.

Figure 1:
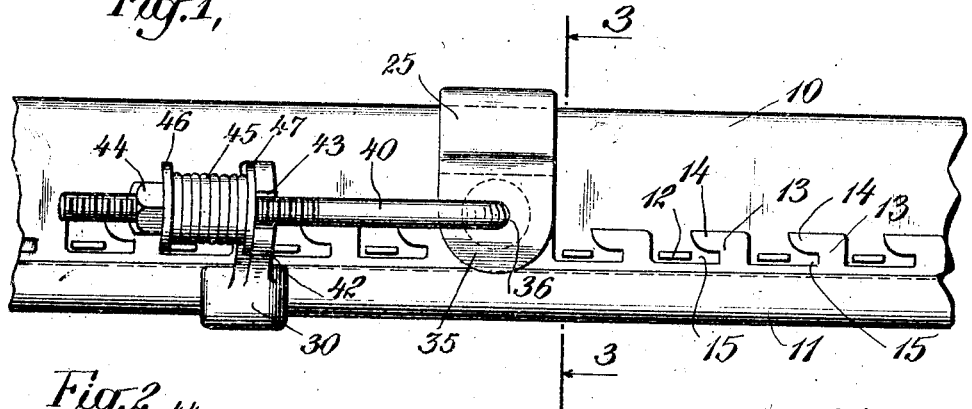
Figure 2:
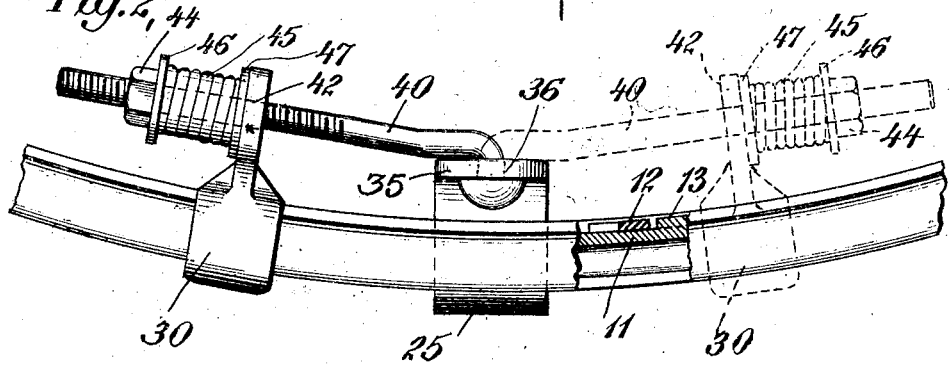
Figure 3:
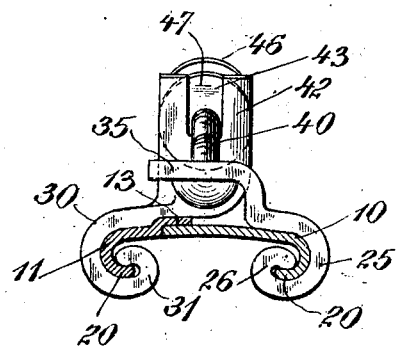

In the drawings, Figure 1 is a top plan view of a section of a vehicle rim to which the tool of my invention is applied. Fig. 2 is a side elevation, with a small portion in cross section, of the parts shown in Fig. 1, and Fig. 3 is a sectional elevation on the line 3—3 of Fig. 1.

Like characters of reference designate corresponding parts in all the figures.

Referring to the drawings, the vehicle wheel rim here shown is of a well known construction such as is largely used for automobiles and other vehicles and comprises two annular members 10 and 11 which are respectively provided with teeth or projections 12 and 13 which coöperate to form a plurality of bayonet joints. The projections 13 have lateral extensions 14 and produce a series of partially closed or L-shaped notches 15. The edge of the rim member 11 which includes the projections 13 is slightly offset in order to fit over the adjacent edge of the member 10. This is shown clearly in Fig. 3. The projections 12 extend radially inward from the edge of the member 10, are uniformly spaced and correspond in number and location to the notches 15 of the member 11, with which they are adapted to coöperate in locking the two rim members together.

The arrangement of parts is such that in assembling the rim members they are pressed together transversely until the projections 12 and the slots 15 occupy the relative positions indicated in Fig. 1. The rim members are then moved circumferentially relative to each other until the projections 12 are forced under the overhanging extensions 14 of the projections 13.

Each of the rim members is usually provided with an annular hook projection 20 which grips the wheel tire in a well known manner.

The reverse of the above described operation is of course necessary in removing the rim.

The bayonet joints between the rim members have hitherto been a source of considerable trouble by reason of the accumulation of dirt and rust which caused considerable difficulty in producing the necessary circumferential movement of the members to disjoint them but according to my present invention, I have provided a simple tool which can be readily applied to the rim members for facilitating either the disjointing or the uniting of the rim members. This tool comprises a clamp 25 having a hook projection 26 which is adapted to be hooked onto the annular projection 20 of the rim member 10 and a swivel bolt 40 and a second clamp 30 which has a hooked projection 31 to engage the annular projection 20 of the rim member 11.

Clamp 25 is provided with an offset body projection 35 having a suitable opening 36 through which the swivel bolt 40 extends. The shank of the bolt is bent at substantially right angles close to the projection 35 and extends when in use substantially parallel to the rim members.

The clamp 30 is provided with a bifurcated section 42 which provides a notch or socket 43 to receive the outer end of the bolt 40. This end of the bolt is screw threaded to receive a nut 44 and a helical spring 45 is coiled about the bolt between the projection 42 of the clamp 30 and the nut 44, washers 46 and 47, being interposed at the respective ends of the spring.

If it is desired to separate the two parts of an assembled rim constructed as herein described and shown in the drawings, the clamp 25 is first hooked on to one of the members, the nut 44 is turned back to a point near the end of the bolt 40, the clamp 30 is hooked onto the other rim member with the shank of the bolt extending through the notch or socket 43. The clamps 25 and 30 are then pushed apart while hooked onto the rim members and the nut 44 is finally turned to compress the spring 45. This action tends to cant the clamps 25 and 30 so that they securely grip the rim members and tend to move them circumferentially, in such a direction as to bring the clamps closer together.

The clamp 30 will be placed on its rim member on the one side or on the other side of the clamp 25, dependent upon whether it is desired to join or disjoin the rim members. As shown in Figs. 1 and 2 of the drawings, the spring 45 is under compression and is tending to disjoint the members 10 and 11. In order to move the members in the opposite direction, and to join them the clamp 30 will be moved to the position shown in broken lines in Fig. 2.

The spring 45 is not intended to be sufficiently powerful to forcibly move the rim members circumferentially in either direction, especially if the joints are clogged with dirt, until the members are tapped with a hammer. In fact it would be difficult to provide a sufficient force, applied locally to the rim members, to disjoin them without tapping because they are more or less resilient and tend to expand and so loosen a few instead of all of the bayonet joints.

It is not my intention to limit my invention to the structural details shown and described nor to any specific rim structure, on the contrary, I intend that only such limitations be imposed as are indicated in the appended claims.

What I claim is:

1. An actuator for tool rims having a plurality of joined parts comprising a rigid member for gripping one rim member, a second rigid member for gripping another rim member at a point spaced from said first member, and means for exerting a continuous pull between said rigid members to cause them to grip the rim members and tending to join or disjoin the rim members.

2. An actuator for two part jointed wheel rims, comprising a clamp for gripping one rim member, a swivel bolt connected thereto, a second clamp, coöperating with the swivel bolt, for gripping the other rim member at a point spaced from said first clamp and means for exerting a continuous pull between the clamps tending to either join or disjoin the rim members.

3. An actuator for two part bayonet joint connected wheel rims, comprising a clamp for gripping one rim member, a swivel bolt connected thereto, a second clamp coöperating with the swivel bolt, for gripping the other rim member at a point spaced from said first clamp and means for exerting a continuous pull between the clamps tending to either join or disjoin the rim members.

4. An actuator for two part bayonet joint connected wheel rims, comprising a clamp for gripping one rim member, a swivel bolt connected thereto, a second clamp coöperating with the swivel bolt, for gripping the other rim member at a point spaced from said first clamp and a compression spring mounted on the bolt and exerting a continuous pull between the clamps tending to either join or disjoin the rim members.

5. An actuator for two part jointed wheel rims, comprising a clamp having a hooked projection for engaging one of the rim members, a swivel bolt connected thereto, a second clamp having a hooked projection for engaging the other rim member at a point spaced from said first clamp and a notch to receive the swivel bolt, and means for exerting a continuous pull between the clamps tending to either join or disjoin the rim members.

6. An actuator for two part jointed wheel rims, comprising a clamp having a hooked projection for engaging one of the rim members, a swivel bolt connected thereto, a second clamp having a hooked projection for engaging the other rim member at a point spaced from said first clamp and a notch to receive the swivel bolt, and a helical compression spring mounted on the shank of the bolt and exerting a continuous pull between the clamps tending to pull the clamps toward each other, whereby the rim members are circumferentially adjusted.

In witness whereof, I have hereunto set my hand this 23 day of September in the year 1912.

ALDEN L. McMURTRY.

Witnesses:
F. GRAVES,
ERNEST W. MARSHALL.